US009653905B2

(12) United States Patent
De Natale et al.

(10) Patent No.: US 9,653,905 B2
(45) Date of Patent: May 16, 2017

(54) POWER SUPPLY AND MEASURING DEVICE FOR AN INTELLIGENT ELECTRONIC DEVICE

(75) Inventors: Gabriele Valentino De Natale, Milan (IT); Marco Testa, Dalmine (IT)

(73) Assignee: ABB Technology AG, Zurich (CH)

( * ) Notice: Subject to any disclaimer, the term of this patent is extended or adjusted under 35 U.S.C. 154(b) by 208 days.

(21) Appl. No.: 14/418,571

(22) PCT Filed: Aug. 1, 2012

(86) PCT No.: PCT/EP2012/065073
§ 371 (c)(1),
(2), (4) Date: Jun. 4, 2015

(87) PCT Pub. No.: WO2014/019623
PCT Pub. Date: Feb. 6, 2014

(65) Prior Publication Data
US 2015/0200532 A1    Jul. 16, 2015

(51) Int. Cl.
*H02M 7/06* (2006.01)
*H02H 1/06* (2006.01)

(52) U.S. Cl.
CPC .............. *H02H 1/06* (2013.01); *H02H 1/063* (2013.01); *H02M 7/06* (2013.01)

(58) Field of Classification Search
CPC ...... Y02B 70/126; H02H 7/127; H02H 3/087; H02M 1/32; H02M 7/06; H03K 17/0826; H03K 17/0822; H01H 71/123
USPC ....... 363/44, 52, 125, 126; 361/88, 93.9, 97, 361/100–101, 115
See application file for complete search history.

(56) References Cited

U.S. PATENT DOCUMENTS

| 5,541,499 | A | * | 7/1996 | Villard | H02H 1/066 323/268 |
| 6,150,739 | A | | 11/2000 | Baumgartl et al. | |
| 8,339,063 | B2 | * | 12/2012 | Yan | H05B 37/02 315/209 R |
| 8,664,885 | B2 | * | 3/2014 | Koolen | H05B 33/0815 315/225 |

FOREIGN PATENT DOCUMENTS

| EP | 0625814 | 11/1994 |
| EP | 1750343 | 2/2007 |

OTHER PUBLICATIONS

European Patent Office—International Searching Authority prepared for PCT/EP2012/065073, International Filing Date Aug. 1, 2012. Date of mailing: May 7, 2013.

* cited by examiner

*Primary Examiner* — Nguyen Tran
(74) *Attorney, Agent, or Firm* — Patterson Intellectual Property Law, PC; Mark J. Patterson; Gary L. Montle (57) ABSTRACT

The present invention relates to a power supply and measuring device for an electronic device (e.g. an IED), which is configured to provide supervision, control, protection, communication and/or monitoring functionalities for LV or MV circuits or apparatuses. The power supply device comprises a current transformer, which is operatively associated to a main power line. An input section of the power supply device comprises a burden regulating stage that is configured to regulate the equivalent electric load at the secondary winding of said current transformer. An output section of the power supply device provides a supply voltage suitable to feed said electronic device.

20 Claims, 4 Drawing Sheets

POWER SUPPLY AND MEASURING DEVICE FOR AN INTELLIGENT ELECTRONIC DEVICE

The present invention relates to technical field of so-called Intelligent Electronic Devices (IEDs) for low voltage (LV) or medium voltage (MV) switchgears or apparatuses.

More particularly, the present invention is related to an electronic power supply and measuring device for supplying electric power to an IED and providing accurate measurements of the current flowing along a power line.

As is widely known, IEDs are electronic arrangements configured to provide supervision, control, protection, communication and/or monitoring functionalities for LV or MV switchgears or apparatuses, e.g. switching devices, such as circuit breakers, disconnectors, contactors and the like.

Within the framework of the present invention the term "low voltage" or "LV" relates to voltages lower than 1 kV AC while the term "medium voltage" or "MV" relates to voltages lower than 72 kV AC.

As is known, an IED is generally arranged so as to be fed by electronic circuitry that derives power from a main power line.

Normally, said electronic circuitry is capable of providing measurements of the current flowing along said main power line.

Traditionally, such an electronic power supply and measuring device comprises a main current transformer that is operatively associated to the main AC power line to derive the electric power needed for the operation of the IED.

Since the current provided by the secondary winding of the main current transformer has normally a remarkably distorted waveform, a further current transformer (or another type of current sensor) is typically arranged to measure the AC current flowing through the main power line.

Currently available power supply and measuring devices are affected by remarkable disadvantages.

Since multiple current transformers are present, they generally have a noticeable size and weight, which makes difficult their installation/integration in a switchboard.

In addition, they are relatively expensive to realize at industrial level.

Further, since the equivalent electric load offered by the IED may notably vary during the operation of this latter, the burden rating of the main current transformer can be easily exceeded, leading the main current transformer to work in a saturation state.

Figure 4:
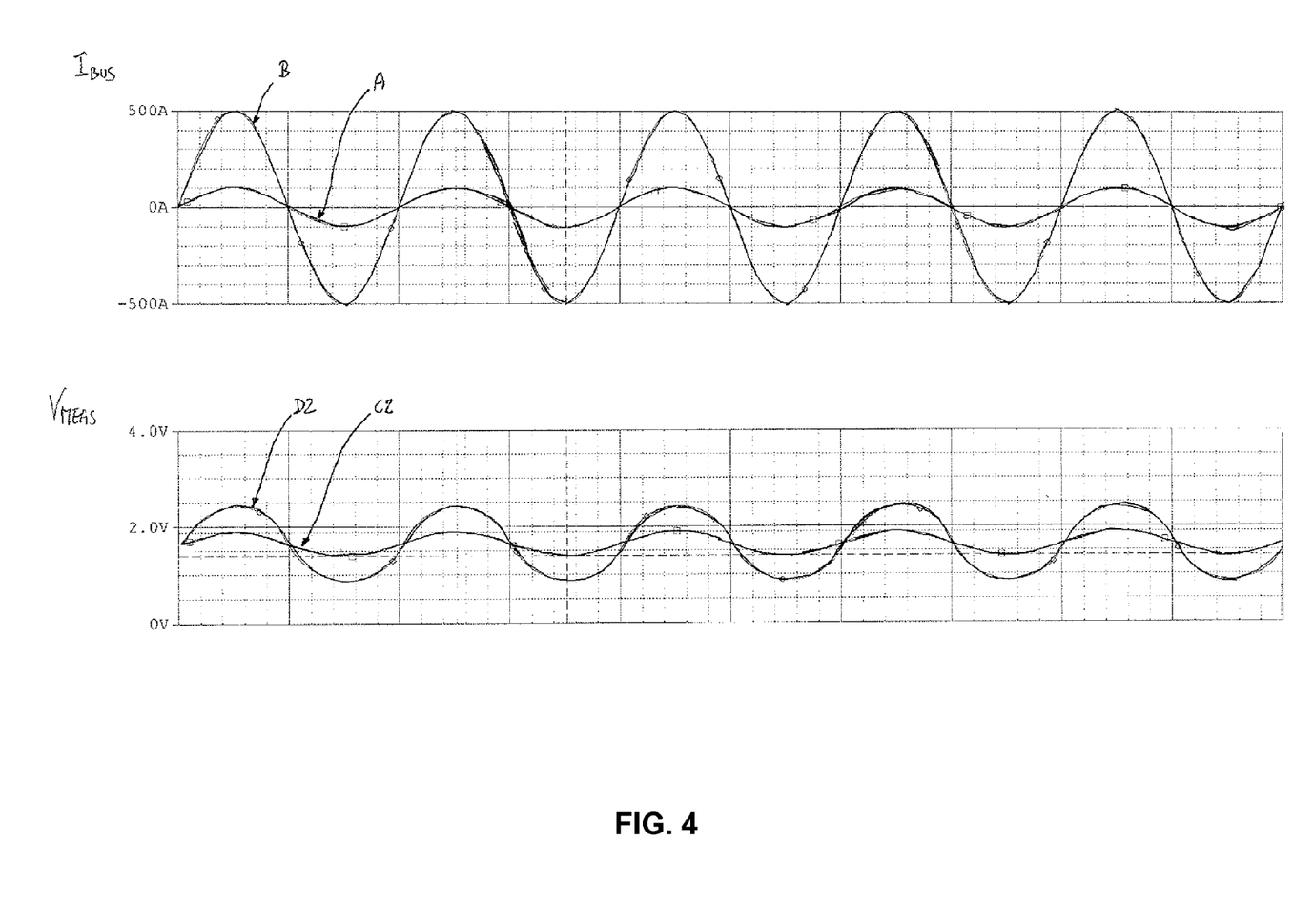
FIG. 4 schematically shows the behaviour of some electric quantities related to the operation of a power supply device and measuring of the known type.

In this case, the main current transformer no more operates linearly with a consequent departure from its ideal behavior, which may cause the generation of harmonics and inter-modulation distortion of the supplied current (see FIG. 4).

The main aim of the present invention is to provide an electronic power supply and measuring device for an electronic device (e.g. an IED) for LV or MV switchgears or apparatuses, which enables the above-described drawbacks to be overcome.

Within the scope of this main aim, another object of the present invention is to provide a power supply and measuring device that is capable of adapting its operation to possible variations of the equivalent electric load offered by the supplied electronic device.

Within the scope of this main aim, another object of the present invention is to provide a power supply and measuring device that is capable of accurately measuring the current circulating along the main power line, from which the electric power for supplying the IED is derived.

Another object of the present invention is to provide a power supply and measuring device that has relatively low weight and size and is relatively easy and low-cost to manufacture on an industrial scale.

The above main aim and objects, as well as other objects that will become apparent from the following description and attached drawings, are achieved according to the invention by an electronic power supply and measuring device, according to the following claim 1 and the related dependent claims.

The power supply and measuring device, according to the invention, comprises an input stage including a burden regulation stage, which is capable of regulating the equivalent electric load (or burden) that is present at the secondary winding of a current transformer that is operatively associated to a main power line for deriving the electric power needed for supplying the IED.

Such a burden regulation stage is capable of maintaining said current transformer out of the saturation region, thereby ensuring a linear operation of this latter.

In this manner, the burden rating of the current transformer is not exceeded even in presence of remarkable variations of the equivalent electric load seen by the secondary winding of said current transformer, e.g. due to variations of the operative conditions of the IED.

Preferably, the input section of the power supply and measuring device, according to the invention, comprises a rectifying stage, which receives the transformer current provided by the secondary winding and provides a rectified current.

Preferably, the mentioned burden regulating stage is configured to maintain a rectified voltage, which is generated at the output terminals of said rectifying stage, below a given reference voltage, the value of which may be preferably changed according to the needs.

Preferably, the input section of the power supply and measuring device, according to the invention, comprises a current measuring stage that is configured to provide a sensing signal, which is indicative of the transformer current provided by the secondary winding of the current transformer.

Since the current transformer constantly operates in a linear region, such a sensing signal provides a measurement of the current flowing along the main power line, with a relatively high level of accuracy.

Advantageously, said current measuring stage comprises one or more sensing resistors configured to sense the transformer current, at said rectifying stage.

The power supply and measuring device, according to the invention, is thus capable of providing accurate current measuring functionalities without the adoption of additional current transformers or other current sensors. This provides considerable benefits in terms of reduction of the overall size and weight.

The power supply and measuring device, according to the invention, is easy to manufacture industrially, with much lower costs with respect to the devices of the state of the art.

Further characteristics and advantages of the present invention will emerge more clearly from the description given below, referring to the attached figures, which are given as a non-limiting example, wherein.

With reference to the above-mentioned figures, the present invention concerns a power supply and measuring device 1 for supplying power to an electronic device 100.

The electronic device 100 may be any electronic arrangement configured to provide supervision, control, protection, communication and/or monitoring functionalities for LV or MV switchgears or apparatuses. For example, the electronic device 100 may be a so-called IED.

The power supply and measuring device 1 comprises a current transformer 2, which is operatively associated to an AC main power line 10, along which a bus current $I_{BUS}$ flows.

The current transformer 2 is advantageously arranged, so that the primary winding of the current transformer 2 is formed by one or more conductors of the main power line 10. This may be achieved by arranging the conductors of this latter, so that they pass through the magnetic core (not shown) of the transformer 2.

The current transformer 2 has a secondary winding 22 that provides an AC transformer current $I_T$, which is obviously substantially proportional to the AC current $I_{BUS}$ flowing along the main power line 10, when the current transformer 2 works in linear conditions The power supply and measuring device 1 comprises an input section 3, which comprises first terminals $T_1$, at which it is electrically connected to the secondary winding 22 of the current transformer 2, and second terminals $T_2$, at which it provides a charging current $I_2$ and a charging voltage $V_2$.

Preferably, the input section 3 comprises a rectifying stage 31, which is electrically connected with the secondary winding 22 at the first terminals $T_1$, so as to receive the transformer current $I_T$.

The rectifying stage 31 comprises fourth terminals $T_4$, at which it provides a rectified current $I_1$.

Preferably, the rectifying stage 31 comprises a diode bridge including diodes $D_1$, $D_2$, $D_3$, $D_4$ that are properly arranged to achieve a full-wave rectification of the transformer current $I_T$.

Since, from a circuit structure point of view, the secondary winding 22 substantially operates as a current generator providing a transformer current $I_T=(1/N) I_{BUS}$ (where N is the transformer ratio), a DC rectified voltage $V_1$ is generated at the terminals $T_4$.

The value of the rectified voltage $V_1$ basically depends on the equivalent electric load that is seen from the terminals $T_4$.

In principle, such an equivalent load mainly depend on the equivalent load offered by the electronic device 100, which may notably vary depending on the operating conditions of this latter.

Preferably, the input section 3 comprises a storing capacitor 37, which is electrically connected in parallel with the terminals $T_2$.

The storing capacitor 37 is charged by at least a portion of the rectified current $I_1$ and is advantageously configured to supply (for a certain period of time) the electric power needed for supplying the electronic device 100, when the electric power derived by the current transformer 2 is too low, as it may occur in case of fault conditions of the main power line 10. Preferably, the input section 3 comprises also a blocking diode $D_5$ that is positioned upstream (referring to the normal circulation direction of the currents $I_1$, $I_2$, as indicated in the cited figures) with respect to the storing capacitor 37, so as to prevent the flow of an inverse current when the charging voltage $V_2$ is higher than the rectified voltage $V_1$.

It is evidenced that, when the blocking diode $D_5$ is in a conduction state, the charging voltage $V_2$ is substantially equal to the rectified voltage $V_1$, apart from a relatively small voltage drop at the diode $D_5$.

Figure 2:
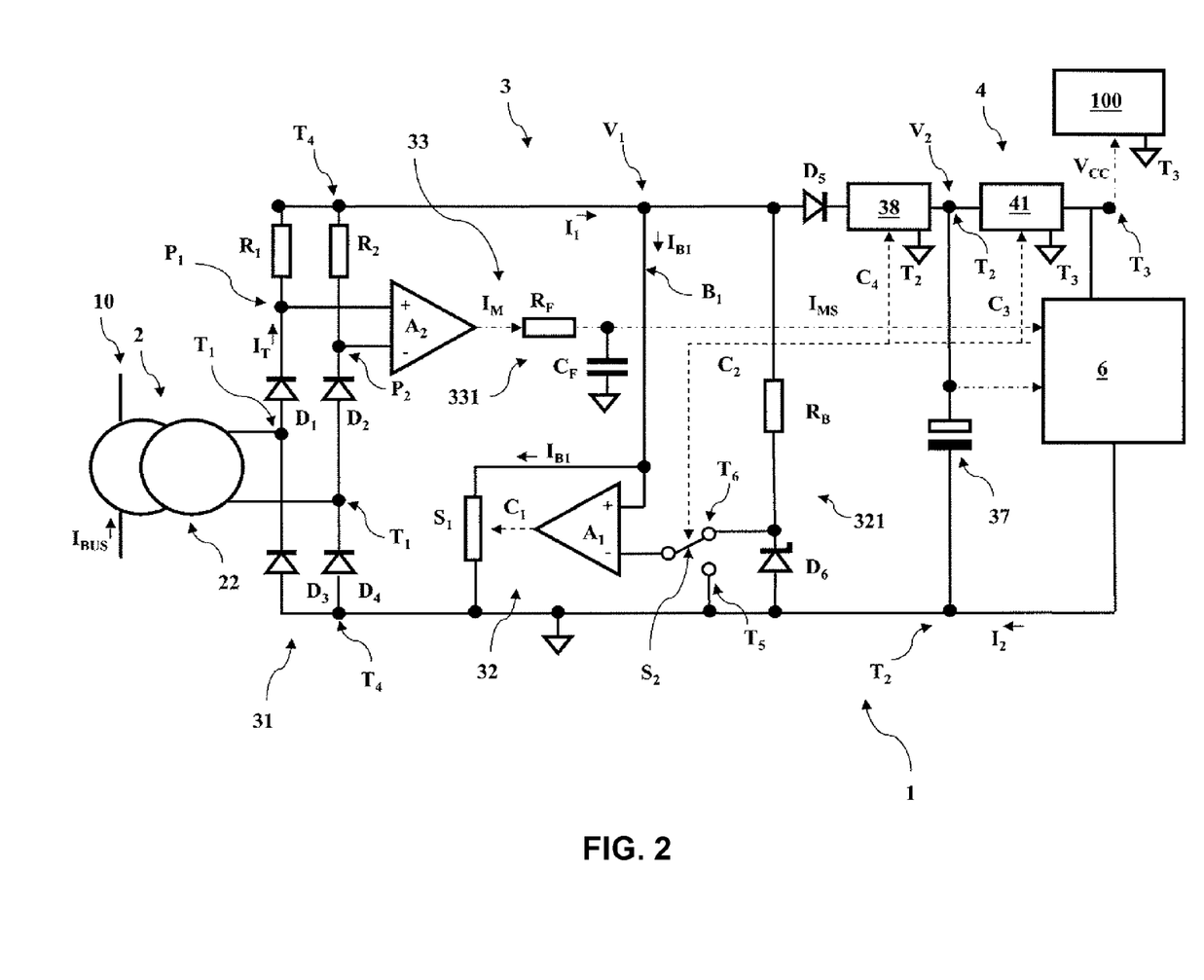
FIG. 2 schematically illustrates the circuit structure of a further embodiment of the power supply and measuring device, according to the present invention.

In the embodiment of the present invention shown in FIG. 2, the input section 3 comprises a step-up switching converter 38, which is arranged at the terminals $T_2$ and is electrically connected upstream with respect to the storing capacitor 37 and downstream with respect to the blocking diode $D_5$.

The step-up switching converter 38 is advantageously configured to step-up the rectified voltage $V_1$, so as to charge the storage capacitor 37 at higher voltage values with respect to those present at the terminals $T_4$ of the rectifying stage 31.

The step-up converter conveniently allows charging the capacitor 37 even if the primary current $I_{BUS}$ is very low, thereby determining the generation of a relatively low charging voltage $V_2$.

The value of the charging voltage $V_2$ may be controlled by varying proper control quantities of the switching converter 38 (e.g. the switching duty cycle and frequency).

To this aim, the operation of the switching converter 38 is properly regulated by fourth command signals $C_4$.

The power supply and measuring device 1 comprises an output section 4, which is electrically connected with the input section 3, at the terminals $T_2$ of this latter.

The output section 4 provides a supply voltage $V_{CC}$ at third terminals $T_3$, which is suitable to feed the electronic device 100.

Preferably, the output section 4 comprises a DC/DC switching converter 41 for converting the charging voltage $V_2$ into the supply voltage $V_{CC}$, the value of which may be controlled by varying proper control quantities of the switching converter 41 (e.g. the switching duty cycle and frequency). To this aim, the operation of the switching converter 41 is properly regulated by third command signals $C_3$.

The input section 3 and the output section 4 are advantageously controlled by a control unit 6. As shown in the cited figures, the control unit 6 is preferably comprised in the power supply and measuring device 1.

Alternatively, the control unit 6 may be included in the electronic device 100 (i.e. it is the control unit of the IED) or be another electronic device that is remotely positioned with respect to the power supply and measuring device 1.

The control unit 6 is preferably a digital processing device, e.g. a microcontroller, which comprises properly arranged computerised means (not shown) for generating second, third and fourth command signals $C_2$, $C_3$, $C_4$ for regulating the operation of the power supply and measuring device 1.

Such computerised means may comprise software programs and/or modules, and/or routines, and/or instructions that can be executed by the control unit 6.

According to the invention, the input section 3 comprises a burden regulating stage 32 that is configured to regulate the equivalent electric load (burden) at the secondary winding 22 of the current transformer 2.

In other words, the burden regulating stage 32 is capable of regulating the equivalent electric load that is seen by the secondary winding 22 at the terminals $T_1$.

In this way, the current transformer 2 may be always kept out of the saturation region, despite of possible variations of the equivalent load offered by the electronic device 100 or sudden increases of the current $I_{BUS}$.

The burden rating of the current transformer 2 may thus be always respected, so as to ensure a substantially linear behaviour of this latter.

According to a preferred embodiment of the present invention, the burden regulating stage 32 is configured to maintain the rectified voltage $V_1$, which is generated at the terminals $T_4$, below a reference voltage $V_{1\_MAX}$.

The value of the reference voltage $V_{1\_MAX}$ is advantageously determined in order to ensure that the burden rating of the current transformer 2 is not exceeded.

For example, it may be calculated according to the relation $V_{1\_MAX}=(1/I_{T\_MAX})$ Bu, where Bu is the burden rating of the current transformer 22 and $I_{T\_MAX}$ is the maximum current $I_T$ that can be provided by the current transformer 2.

As it will be illustrated in the following, in particular operating conditions, the value of the reference voltage $V_{1\_MAX}$ may be changed in order to comply with to different operating criteria, e.g. to reduce power dissipation in the burden regulating stage 32.

Preferably, the burden regulating stage 32 comprises a first switching device $S_1$, which can be commutated to allow/block the flow of a burden current $I_{B1}$ along a circuit path $B_1$ that is arranged in parallel to the terminals $T_4$ of the rectifying stage 31.

The switching device $S_1$ may be a BJT/MOSFET transistor having the collector/drain and emitter/source terminals electrically connected in parallel with the terminals $T_4$ and the base/gate terminal configured to receive first command signals $C_1$.

When the switching device $S_1$ is in a conduction state, the burden current $I_{B1}$ is allowed to flow along the path $B_1$. In this case, from a circuit structure point of view, the equivalent electric load that is seen by the secondary winding 22 at the terminals $T_1$ decreases, leading to a corresponding decrease of the voltage $V_1$ at the terminals $T_4$.

When the switching device $S_1$ is in off-state, the burden current $I_{B1}$ is not allowed to flow and the equivalent electric load that is seen by the secondary winding 22, at the terminals $T_1$, is basically determined by the equivalent load offered by the circuits positioned downstream the terminals $T_4$, in particular electronic device 100.

From the above, it is apparent how the equivalent electric load (burden) that is seen by the secondary winding 22 at the terminals $T_1$ may be varied by properly operating the switching device $S_1$.

Preferably, the burden regulating stage 32 comprises a driving circuit $A_1$, which compares the voltage $V_1$ with the reference voltage $V_{1\_MAX}$.

The driving circuit $A_1$ may comprise an operational amplifier circuit having a first input terminal electrically connected with the terminal $T_4$ and a second input terminal electrically connected with a fifth terminal $T_5$ or a sixth terminal $T_6$, at which the reference voltage $V_{1\_MAX}$ is made available.

On the base of the performed voltage comparison, the driving circuit $A_1$ provides first command signals $C_1$ for regulating the operation of the first switching device $S_1$, in particular for commutating this latter between the conduction state and the interdiction state, or viceversa.

Preferably, the burden regulating stage 32 comprises a biasing circuit 321 that is configured to provide the reference voltage $V_{1\_MAX}$.

The biasing circuit 321 is preferably electrically connected in parallel with respect to the terminals $T_4$ and it advantageously comprises the bias resistor $R_B$, the Zener diode $D_6$ and the terminals $T_5$, $T_6$.

The biasing circuit 321 is preferably arranged so that the terminals $T_5$, $T_6$ make available a reference voltage $V_{1\_MAX}$ having different values.

The terminal $T_5$ is arranged to make available a reference voltage $V_{1\_MAX}$ at a lower voltage (e.g. 0V).

On the other hand, the terminal $T_6$ is arranged to make available a reference voltage $V_{1\_MAX}$ having a value $V_{1\_MAX}=(1/I_{T\_MAX})$ Bu, which may be advantageously established by the Zener diode $D_6$.

Preferably, the biasing circuit 321 comprises a second switching device $S_2$, which can be commutated to change the value of the reference voltage $V_{1\_MAX}$, which is made available, by electrically connecting the second input terminal of the driving circuit $A_1$ with one or the terminals $T_5$, $T_6$.

Advantageously, the switching device $S_2$ (for example a bistable switch) is driven by second command signals $C_2$ that are preferably provided by the control unit 6.

Preferably, the commutation state of the switching device $S_2$ is determined on the base of a power dissipation value $P_1$ related to the first switching device $S_1$.

If the power dissipation value $P_1$ is lower than a threshold value $P_{1\_MAx}$, the switching device $A_2$ is operated so that the second input terminal of the driving circuit $A_1$ is electrically connected with the terminal $T_6$, which provides a reference voltage $V_{1\_MAX}$ that is basically established on the base of the constructive characteristics of the current transformer 2.

If the power dissipation value $P_1$ exceeds the threshold value $P_{1\_MAX}$, the switching device $S_2$ is operated so that the second input terminal of the driving circuit $A_1$ is electrically connected with the terminal $T_5$, which provides a reference voltage $V_{1\_MAX}$ that is basically established for reducing the power dissipation of the switching device $S_1$.

In fact, it is noticed that the power dissipation of switching device $S_1$ is remarkably reduced in case the second input terminal of the driving circuit $A_1$ is electrically connected with the terminal $T_5$, since the path $B_1$, in which the switching device $S_1$ is inserted, is in practice short-circuited by the circuit path formed by the bias resistor $R_B$, the switch $S_2$ and the terminal $T_5$.

Preferably, the power dissipation value $P_1$ of the switching device $S_2$ is determined by the control unit 6 on the base of a measured value of the charging voltage $V_2$, which can be measured by a voltage sensor (not shown), and a measured value of the transformer current $I_T$. Preferably, the input section 3 comprises a current measuring stage 33 that is configured to provide a sensing signal $I_{MS}$ indicative of the transformer current $I_T$ provided by the current transformer 2 at the terminals $T_1$.

The current measuring stage 33 provides a measurement of the current $I_T$ at the secondary winding 22 of the current transformer 2.

Since the current transformer 2 constantly works in a linear region the sensing signal $I_{MS}$ is also indicative of the current $I_{BUS}$ flowing along the main power line 10.

The current measuring stage 33 does not comprise further current transformers for measuring the current $I_T$ but it advantageously comprises one or more sensing resistors (or shunt circuits of similar type) $R_1$, $R_2$, which are configured to sense the transformer current $I_T$, at the rectifying stage 31.

The sensing resistors $R_1$, $R_2$ are operatively arranged at different branches of the diode bridge including the diodes $D_1$, $D_2$, $D_3$, $D_4$, said branches being juxtaposed with respect to a same output terminal $T_4$ of the rectifying stage 31.

Figure 1:
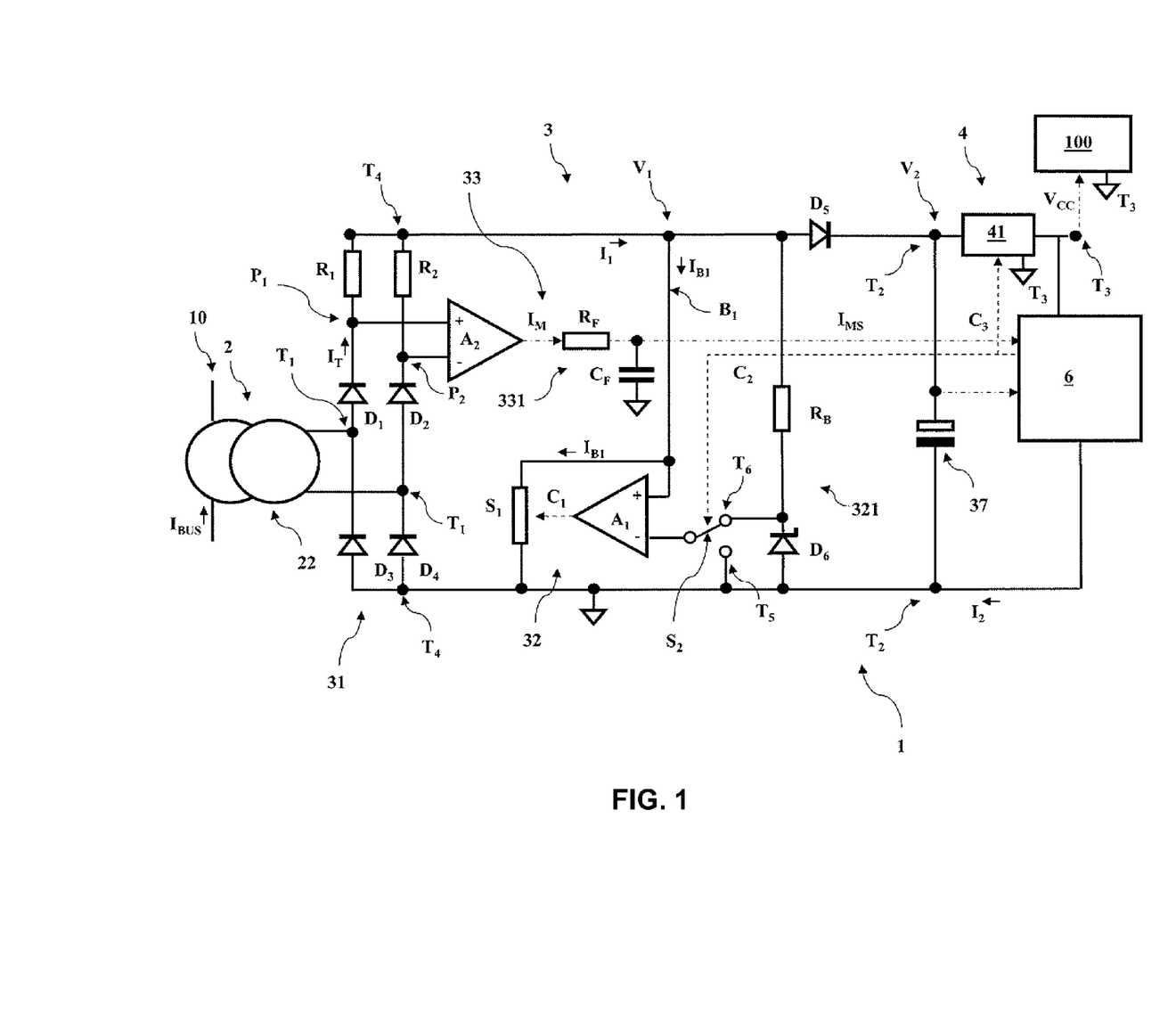
FIG. 1 schematically illustrates the circuit structure of an embodiment of the power supply and measuring device, according to the present invention.

In the embodiment shown in the cited FIGS. 1-2, the resistors $R_1$, $R_2$ are respectively arranged between the diodes $D_1$ (first connection point $P_1$) and $D_2$ (second connection point $P_2$) and the same terminal $T_4$ (advantageously the one that is normally at a different voltage with respect to ground). At the connection points $P_1$, $P_2$, the resistors $R_1$, $R_2$ are electrically connected with different terminals $T_1$ of the input section 3, respectively.

As an alternative, the resistors $R_1$, $R_2$ may be arranged at the other side of the diode bridge. In particular, the resistor $R_1$ may be electrically connected between the diode $D_3$ (first connection point $P_1$) and a dedicated ground terminal while the resistor $R_2$ may be electrically connected between the diode $D_4$ (second connection point $P_2$) and the terminal $T_4$ at ground voltage.

The current measuring stage 33 preferably comprises a comparing circuit $A_2$ that is electrically connected with the connection points $P_1$, $P_2$ of the resistors $R_1$, $R_2$ and is configured to determine the difference between the voltages at said connection points $P_1$, $P_2$ and provide a measuring signal $I_M$ indicative of the transformer current $I_T$ that circulates along the diode bridge branches.

The comparing circuit $A_2$ may comprise a differential instrumentation amplifier having its input terminals electrically connected with the connection points $P_1$, $P_2$.

The current measuring stage 33 preferably comprises a filtering circuit 331, including for example a filtering resistor $R_F$ and a filtering capacitor $C_F$, which is electrically connected with the comparing circuit $A_2$.

The filtering circuit 331 is configured to filter the measuring signal $I_M$, so as to obtain the sensing signal $I_{MS}$.

The filtering action of the filtering circuit 331 advantageously allows reducing the noise generated by the diodes $D_1$, $D_2$, $D_3$, $D_4$, when these latter commutate.

Preferably, the sensing signal $I_{MS}$ is sent to the control unit 6, which can advantageously use it to calculate the power dissipation value $P_1$ related to the first switching device $S_1$.

Of course, the sensing signals $I_{MS}$ may be provided also to the electronic device 100 and used for the operation of this latter.

Figure 3:
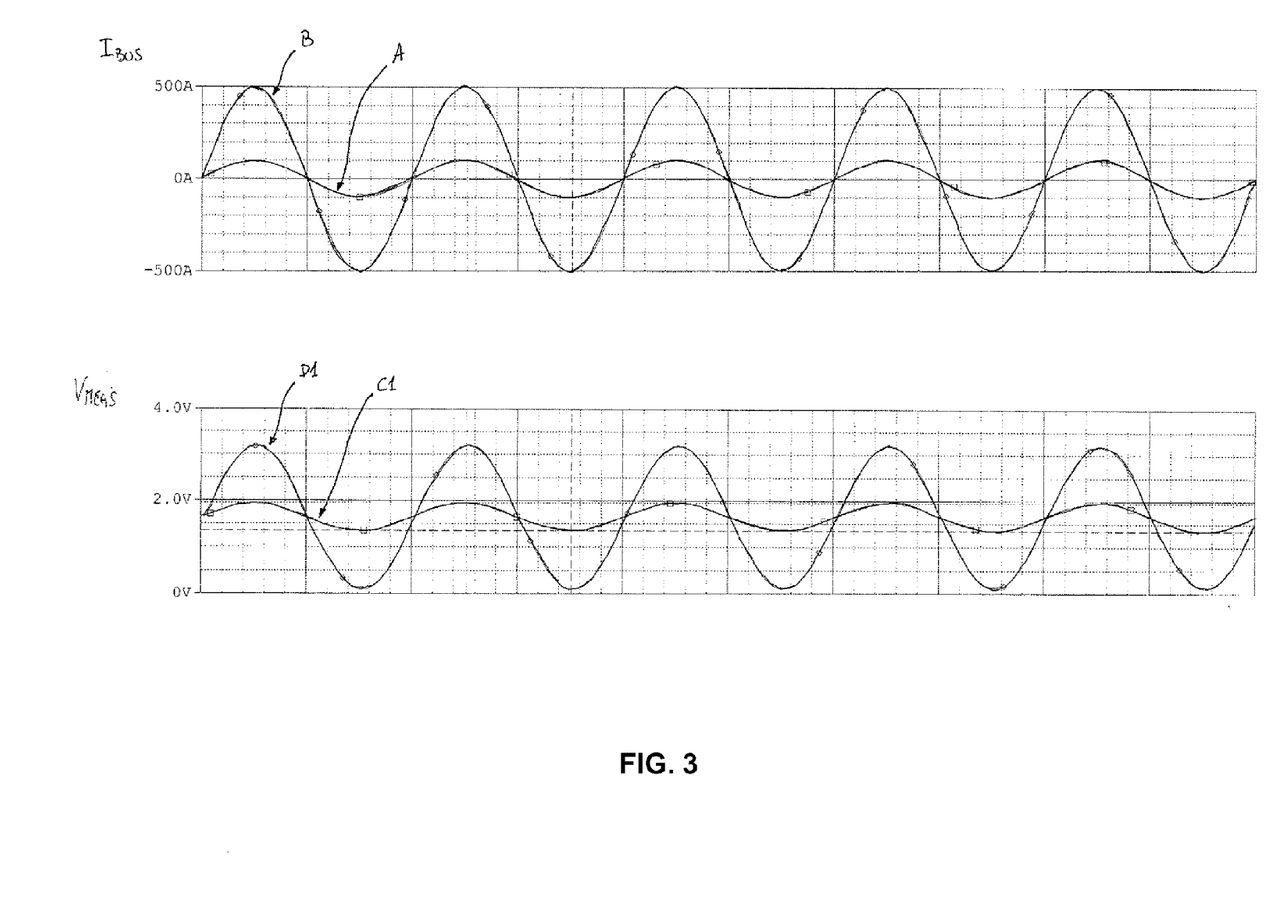
FIG. 3 schematically shows the behaviour of some electric quantities related to the operation of the power supply and measuring device, according to the present invention.

Referring to FIGS. 3-4, it is possible to appreciate the advantages of the power supply and measuring device 1 with respect of a device of traditional type.

FIGS. 3-4 relate to electric quantities that have been measured adopting P_SPICE™ simulation models of the power supply and measuring device 1 and of a traditional device, respectively.

In FIG. 3, the curves A, B are related to different waveforms of the current $I_{BUS}$, in different operative conditions. As it can be appreciated, the AC current $I_{BUS}$ of the waveform B is remarkably increased with respect to the waveform A.

The curves C1, D1 are related to the behaviour of a measured voltage $V_{MEAS}$, which is indicative of the AC transformer current $I_T$ in the power supply and measuring device 1, when the current $I_{BUS}$, behaves according to the waveform A, B, respectively.

It is apparent how in the power supply and measuring device 1 the measured voltage $V_{MEAS}$ constantly follows the variations of the current $I_{BUS}$. In fact, thanks to the presence of the burden regulation stage 32, the current transformer 2 always works in linear conditions, despite of the relevant variations of the current $I_{BUS}$. The burden rating of the current transformer 2 is never exceeded and the transformer current $I_T$ at the secondary winding 22 is not distorted.

In FIG. 4, the curves A, B are again related to different waveforms of the current $I_{BUS}$, in different operative conditions.

The curves C2, D2 are related to the behaviour of a measured voltage $V_{MEAS}$, which is indicative of the AC transformer current, in a traditional device, when the current $I_{BUS}$, behaves according to the waveform A, B, respectively.

It is apparent how the measured voltage $V_{MEAS}$ does not follow the variations of the current $I_{BUS}$. When the current $I_{BUS}$ notably increases (curve B), the current transformer works in the saturation region and the transformer current provided at the secondary winding shows relevant distortions (curve D2).

It has been shown in a practice that the power supply and measuring device 1, according to the present invention, fully achieves the intended aim and objects.

The power supply and measuring device 1 is capable of compensating the effects of possible variations of the equivalent load offered by the IED or the effects of sudden variations of the current flowing along the main power line, thereby ensuring that the burden rating of the transformer, operatively associated with the main power line is not exceeded.

The power supply and measuring device 1 provides accurate measurements of the current circulating along the main power line without the adoption of additional current transformers dedicated to such a measuring functionality.

The power supply and measuring device 1 is characterised by notably lower weight and size with respect to the devices of the state of the art.

The power supply and measuring device 1 has proven to be quite easy to manufacture at industrial level, at competitive costs with respect to the devices of the state of the art.

The electronic power supply and measuring device thus conceived is susceptible of modifications and variations, all of which are within the scope of the inventive concept as defined in particular by the appended claims; any possible combination of the previously disclosed embodiments can be implemented and has to be considered within the inventive concept of the present disclosure; all the details may furthermore be replaced with technically equivalent elements.

The invention claimed is:

1. A power supply and measuring device (1) for an electronic device (100), which is configured to provide supervision, control, protection, communication and/or monitoring functionalities for low voltage (LV) or medium voltage (MV) switchgears or apparatuses, characterised in that the power supply and measuring device comprises:

a current transformer (2), which is operatively associated to a main power line (10) and has a secondary winding (22) that provides a transformer current (IT);

an input section (3), which comprises first terminals (T1), at which said input section is electrically connected to the secondary winding (22) of said current transformer, and second terminals (T2), at which said input section provides a charging current (I2) and a charging voltage (V2), said input section comprising a burden regulating stage (32) that is configured to regulate an equivalent electric load at the secondary winding of said current transformer, and a rectifying stage (31), which receives said transformer current and provides a rectified current (I1), at fourth terminals (T4), said burden regulating stage (32)

being configured to maintain a rectified voltage (V1), which is generated at said fourth terminals (T4), below a reference voltage (V1_MAX);

an output section (4), which is electrically connected with said input section (3), at said second terminals (T2), and which provides, at third terminals (T3), a supply voltage (VCC) suitable to feed said electronic device (100); and wherein said burden regulating stage (32) comprises a biasing circuit (321), which is configured to provide said reference voltage (V1_MAX) and comprises a switching device (S2) which can be commutated to change the value of said reference voltage (V1_MAX).

2. A power supply and measuring device, according to claim 1, wherein said switching device (S2) comprises a second switching device (S2), and said burden regulating stage (32) comprises a first switching device (S1), which can be commutated to allow/block the flow of a burden current (IB1) along a circuit path (B1) that is electrically connected in parallel with the fourth terminals (T4) of said rectifying stage (31).

3. A power supply and measuring device, according to claim 2, characterised in that said burden regulating stage (32) comprises a driving circuit (A1), which compares said rectified voltage (V1) with said reference voltage (V1_MAX), said driving circuit being configured to provide first command signals (C1) for regulating the operation of said first switching device (S1).

4. A power supply and measuring device, according to claim 2, characterised in that said second switching device (S2) is driven by second command signals (C2) that are provided by a control unit (6) on the base of a power dissipation value (P1) related to said first switching device (S1).

5. A power supply and measuring device, according to claim 1, characterised in that said input section (3) comprises a current measuring stage (33) that is configured to provide a sensing signal (IMS), which is indicative of the transformer current (IT) provided by said current transformer (2) at said first terminals (T1), said current measuring stage (33) comprising one or more sensing resistors (R1, R2) configured to sense said transformer current (IT) at said rectifying stage (31).

6. A power supply and measuring device, according to claim 5, characterised in that said current measuring stage (33) comprises first and second sensing resistors (R1, R2), which are electrically connected with said first terminals (T1) and with a same fourth terminal (T4) of said rectifying stage (31).

7. A power supply and measuring device, according to claim 6, characterised in that said current measuring stage (33) comprises a comparing (A2) that is electrically connected with connection points (P1, P2) of said first and second sensing resistors (R1, R2) with said first terminals (T1), said comparing circuit being configured to compare the voltages detected at said connection points (P1, P2) and provide a measuring signal (IM) indicative of said transformer current (IT).

8. A power supply and measuring device, according to claim 7, characterised in that said current measuring stage (33) comprises a filtering circuit (331), which is electrically connected with said comparing circuit (A2), said filtering circuit being configured to filter said measuring signal (IM), so as to obtain said sensing signal (IMS).

9. A power supply and measuring device, according to claim 1, characterised in that said output section comprises a DC/DC switching converter (41) for converting said charging voltage (V2) into said supply voltage (VCC).

10. A power supply and measuring device, according to claim 1, characterised in that said input section (3) comprises a storing capacitor (37), which is electrically connected in parallel with said second terminals (T2).

11. A power supply and measuring device, according to claim 9, characterised in that said input section (3) comprises a step-up switching converter (38), which is configured to step-up said rectified voltage (V1).

12. A power supply and measuring device for an electronic device comprising:
a current transformer having a primary winding configured to couple to a main power line and a secondary winding configured to provide a transformer current;
an input section comprising
a first pair of terminals electrically coupled to the secondary winding of the current transformer,
a second pair of terminals at which the input section is configured to provide a charging current and a charging voltage,
a rectifying stage configured to receive the transformer current and to provide a rectified current at a fourth pair of terminals, and
a load regulating stage configured to regulate an equivalent electric load at the secondary winding of the current transformer, and maintain a rectified voltage at the fourth pair of terminals below a reference voltage; and
an output section electrically coupled to the input section at the second pair of terminals, the output section configured to provide at a third pair of terminals a supply voltage for an electronic device,
wherein the load regulating stage further comprises
a first switching device configured to selectively allow and block a flow of load current along a circuit path that is electrically coupled in parallel with the fourth pair of terminals of the rectifying stage,
a driving circuit configured to compare the rectified voltage with the reference voltage, and to provide first command signals regulating operation of the first switching device, and
a biasing circuit configured to provide the reference voltage, the biasing circuit comprising a second switching device configured to change the value of the reference voltage.

13. The power supply and measuring device of claim 12, further comprising a control unit, and wherein the second switching device is configured to be driven by second command signals provided by the control unit on based on a power dissipation value associated with the first switching device.

14. The power supply and measuring device of claim 13, wherein:
the input section further comprises a current measuring stage configured to provide a sensing signal indicative of the transformer current provided by the current transformer at the first pair of terminals; and
the current measuring stage comprises at least one sensing resistor configured to sense the transformer current at the rectifying stage.

15. The power supply and measuring device of claim 14, wherein:
the current measuring stage comprises first and second sensing resistors electrically coupled to the first pair of terminals and with a corresponding one of the fourth pair of terminals of the rectifying stage.

16. The power supply and measuring device of claim 15, wherein:
the current measuring stage further comprises a comparing circuit electrically coupled to connection points of the first and second sensing resistors with the first pair of terminals; and
the comparing circuit is configured to compare voltages detected at the connection points and to provide a measuring signal indicative of the transformer current.

17. The power supply and measuring device of claim 16, wherein:
the current measuring stage further comprises a filtering circuit electrically coupled with the comparing circuit; and
the filtering circuit is configured to filter the measuring signal to obtain the sensing signal.

18. The power supply and measuring device of claim 17, wherein the output section further comprises a DC/DC switching converter configured to convert the charging voltage into the supply voltage.

19. The power supply and measuring device of claim 18, wherein the input section further comprises a storage capacitor electrically coupled in parallel with the second pair of terminals.

20. The power supply and measuring device of claim 19, wherein the input section further comprises a step-up switching converter configured to step-up the rectified voltage.

* * * * *